United States Patent [19]
Garshelis

[11] 4,012,959
[45] Mar. 22, 1977

[54] PRESSURE GAUGE AND FLOW METER

[76] Inventor: Ivan J. Garshelis, 61 Oleander Way, Clark, N.J. 07066

[22] Filed: Oct. 22, 1975

[21] Appl. No.: 624,524

Related U.S. Application Data

[62] Division of Ser. No. 488,209, July 12, 1974, Pat. No. 3,961,297.

[52] U.S. Cl. ............................ 73/398 R; 73/194 EM
[51] Int. Cl.² ........................ G01L 9/10; G01F 1/58
[58] Field of Search ............... 335/3, 215; 317/143; 73/398 R, 194 EM; 336/30

[56] References Cited
UNITED STATES PATENTS 3,530,719   9/1970   Altfillisch ........................ 73/398 R
3,940,992   3/1976   Jost et al. ........................ 73/398 R

*Primary Examiner*—Donald O. Woodiel
*Attorney, Agent, or Firm*—Hubbell, Cohen, Stiefel & Gross

[57] ABSTRACT

Devices relying on the Inverse Wiedman Effect. Devices include a current conductive, magnetically anisotropic rod, through which an AC current flows. Wound about the rod is a conductive coil having output terminals. By varying the AC current, the anisotropy, or both, variations in the output across coil terminals can be obtained. Devices may be for current sensing, pressure sensing, fluid flow sensing or an electric push button.

2 Claims, 5 Drawing Figures

PRESSURE GAUGE AND FLOW METER

This is a division of application Ser. No. 488,209, filed July 12, 1974, now U.S. Pat. No. 3,961,297.

RELATED APPLICATIONS

This invention is related to the inventions described in four applications filed by me concurrently herewith, which applications are identified as MAGNETOELASTIC, REMANENT HYSTERITIC DEVICES, Ser. No. 488,208, now U.S. Pat. No. 3,932,112, ELECTROMECHANICAL TRANSDUCERS, Ser. No. 488,219, now U.S. Pat. No. 3,959,751, MECHANICAL MAGNET, Ser. No. 488,841, now U.S. Pat. No. 3,939,448, and METHOD AND APPARATUS FOR CIRCULARLY MAGNETIZING A HELICAL CONDUCTIVE ROD, Ser. No. 488,220, now U.S. Pat. No. 3,927,386, the contents of all of which are hereby incorporated by reference in their entireties.

BACKGROUND OF THE INVENTION

1. Field of the Invention

This invention relates to electromagnetic anisotropic devices and particularly to such devices made out of a current conductive rod which is carrying sufficient current therethrough to reverse the direction of the helical magnetization produced by said current each half cycle. More particularly, this invention relates to such electromagnetic anisotropic devices that have a conductive coil wound around the current carrying rod for producing an output voltage in accordance with the change in axial flux linkages resulting from the change in direction of helical magnetization.

2. Description of the Prior Art

For many years the so-called Wiedemann Effect has been well known. The Wiedemann Effect is the twist produced in a wire that exhibits magnetostriction when that wire is placed in a longitudinal magnetic field and an electric current flows through the wire. The converse or inverse of this phenomenon has also been recognized and is commonly called the Inverse Wiedemann Effect. In the Inverse Wiedemann Effect, axial magnetization is produced in a magnetostrictive wire that carries current therethrough when the wire is being twisted.

There have been a number of attempts to employ the Wiedemann and Inverse Wiedemann Effect in practical applications. Such attempts are discussed at length in an article by J. A. Granath entitled "Instrumentation Applications Of Inverse Wiedemann Effect" which appeared in the Journal of Applied Physics, Volume 31, pp 178S–180S (May 1961), and in a publication by the International Nickel Company, Inc. of New York, New York, entitled "Magnetostriction". At least two United States patents disclose the devices relied upon in the Inverse Wiedemann Effect, namely U.S. Pat. No. 2,511,178 granted to H. C. Roters on June 13, 1950, and U.S. Pat. No. 3,083,353, granted to A. H. Bobeck on Mar. 26, 1963. The Roters patent is directed to devices including magnetostrictive rods that exhibit essentially a linear characteristic curve when one plots the axial magnetic induction ($B_{ax}$) versus the angle of twist ($\alpha$) of said rod. There is no suggestion in Roters of using anisotropic materials. Bobeck, on the other hand, does rely on anisotropy for producing a memory device for computers or the like. However, in the Bobeck devices the level of the current being passed through the anisotropic rod is never sufficient to cause a reversal of the direction of helical magnetization in said rod and hence is insufficient to cause a change in flux linkage with the surrounding coil to produce an output voltage.

SUMMARY OF THE INVENTION

A current carrying rod which exhibits magnetic anisotropy in other than a purely circular or purely longitudinal direction has a conductive coil wound thereabout. An alternating current is passed through said rod to produce helical magnetization. The magnitude of the current is sufficiently great so that at least during a portion of the operation of the device the curent is so great as to produce the helical magnetization in the rod in a given direction during one half cycle and to cause a reversal of the direction of helical mangnetization during the next half cycle, whereby to cause a change in the linkage of the axial flux in said rod with the conductive coil to thereby produce an AC output at the terminals of the conductive coil.

Such a device may be employed as a current detector or to measure a variety of other parameters such as pressure or fluid flow. Thus, for example, the current flowing through the anisotropic rod can be monitored by measuring the output voltage across the output terminals of the conductive coil wound thereabout. If such a device is incorporated as a current overload device, whereby to protect against excessive current, the anisotropic rod may be constructed so that a normal current flowing through the rod will not cause reversal of direction of the helical magnetization in the rod during each half cycle of normal current. However, when there is a current overload, the overload current will be sufficient to cause reversal of direction of helical magnetization which will cause a change in the flux linkages with the surrounding conductive coil and produce an output signal. This output signal can be employed to actuate a mechanism to open the circuit which includes the anisotropic rod such as in a circuit breaker or the like. On the other hand, the anisotropic rod can be connected in series with a welding circuit to detect the loss of current in the discontinuance of the welding operation. When this is done the anisotropy of the rod is arranged so that normal welding current will produce reversal of direction of helical magnetization within the rod during each half cycle so as to produce a steady output voltage across the output terminals of the conductive coil. However, when current ceases to flow through the rod as when the welding operation is inadvertently discontinued, there will be a loss of voltage across the output terminals of the conductive coil which is detectable and which can be employed to actuate a mechanism to restart the welding.

In other applications of this invention, means for varying the anisotropy of the rod may be employed which means are varying the amount of twist of a magnetostrictive current carrying rod. As the anisotropy is varied, either the threshold of necessary current flowing through the rod to cause a reversal of direction of helical magnetization therewithin will be changed, whereby to cause at some point either the appearance of an output voltage across the conductive coil surrounding the rod or the disappearance of such signal, or a variation in the magnitude of such output signal. The variation in twist may be a function of pressure being monitored or a function of fluid flow through the rod, or the like. As still another alternative, the variation of twist may be the result of the compression of a helically wound anisotropic rod as by the pressing of a push button including said rod.

DETAILED DESCRIPTION OF THE PREFERRED EMBODIMENTS

In the following specification and the claims annexed hereto a material is said to exhibit "magnetic anisotropy", or anisotropy when it shows a predisposition to be magnetized in a given predetermined direction as compared with all other directions. The magnetically anisotropic materials employed in the present invention are said to be employed in "rods". As used herein a rod may be a solid device or it may be a tubular device. It might also include composite materials, such as a solid rod having a core of one material and an outer covering of another material.

Figure 1:
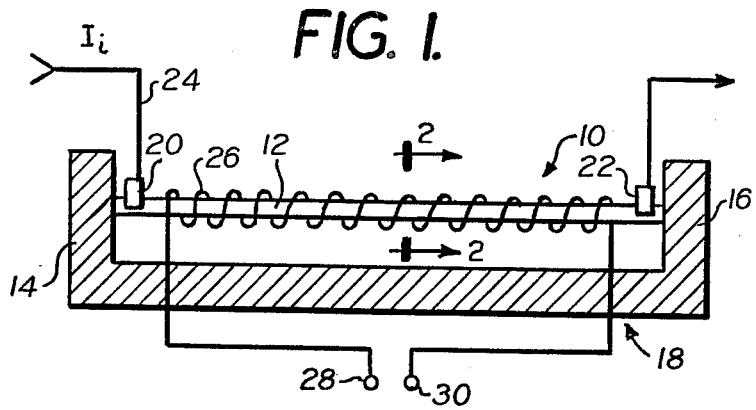
FIG. 1 is a view, partly diagrammatic, partly sectional and partly in elevation, illustrating a current detecting mechanism embodying the present invention.
Figure 2:
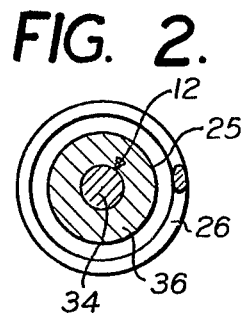
FIG. 2 is a sectional view taken along the line 2—2 of FIG. 1.

Referring now to FIGS. 1 and 2 of the drawings, a current detection mechanism 10 is illustrated. This current detection mechanism includes a rod 12 that exhibits the property of magnetic anisotropy. Although alternate means may be employed to obtain anisotropy in rod 12, as shown herein the magnetic anisotropy is achieved by twisting the rod. The amount of twist is a matter of design choice. It is preferably less than that which would exceed the elastic limit of the material in tension, usually of the order of not more than about 1° twist per centimeter of length for rods having a diameter of about 3 mm. Specifically, it will be seen that the rod 12 is mounted between the two legs 14 and 16 of a U-shaped member 18. The rod is first twisted and then is secured in its twisted condition between the legs of the U-shaped member 18 to hold it in twisted condition. This will cause the rod to exhibit magnetic anisotropy if it is made of a suitable material. A suitable material is one which will exhibit a sufficiently high anisotropy from the twist as compared with other anisotropies that might be present in the material such as, for example, from crystal lattice structure or the like. Specifically, materials such as nickel, nickel-iron alloys, cobalt nickel alloys, and cobalt-iron alloys all exhibit excellent magnetoelastic anisotropy when compared with other existing anisotropies in such materials.

Disposed near the outer ends of the rod 12 are a pair of terminals 20 and 22 for connection to a suitable current carrying line 24 to place the rod 12 in series with said line. It will be recognized that rather than having the rod 12 in series with the line being monitored, which in FIG. 1 is the line 24, an intervening device such as a current transformer or the like may be interposed between the line being monitored and the rod 12 so that a current proportional to the current being monitored will actually flow through the rod.

Wound about the rod 12 is a conductive coil 26, preferably made of a good conductor such as copper wire or the like, which coil is designated by the reference numeral 26 and having output terminals 28 and 30. Clearly, with rod 12 conductive either coil 26 or rod 12 must be insulated to prevent current interaction between them. While coil 26 is shown to be overlying substantially the entire length of the rod 12, it will be recognized that it can overlie a portion only of the length, this being a matter of design choice.

It is not necessary that the coil 26 be wound directly on the rod 12. Thus, the coil 26 may be wound separately on a bobbin or the like, and then the bobbin with the coil 26 thereon may be slid over the rod 12 in order to dispose the coil 26 about the rod. Assuming the bobbin is insulating, this takes care of the insulation problem provided adjacent turns of coil 26 do not touch one another. If they do, it will be necessary to insulate the wire of coil 26, as by lacquer. In FIG. 2 the bobbin is designated by the reference character 25 and is shown snugly fit about the exterior of the rod 12. This makes the assembling of this device extremely simple as contrasted with a variety of other current detecting devices presently available which require the winding of toroidal coils on anisotropic toroidal coils. Such a winding operation is considerably more complex and more costly than the winding operation necessary to make device 10.

The device 10 may be employed as either a current overload detection mechanism as in a circuit breaker or the like, or as a device for determining that current has dropped below a certain desired level and then producing an output to initiate corrective action with respect thereto. Assuming first that the device 10 is incorporated in an overcurrent device such as a circuit breaker, the current being monitored is the current $I_1$ flowing through the line 24, and the rod 12 in series therewith. When the current $I_1$ is normal, that is below a predetermined value, the current reversals during each half cycle are insufficient to cause irreversible magnetization changes which would lead to a reversal of direction of the helical magnetization caused by the current $I_1$ flowing through the rod 12. However, when the current $I_1$ increases above a predetermined level, then the current reversals each half cycle are sufficient to cause such irreversible magnetization changes which changes result in a change of direction of the helical magnetization each half cycle. This being the case during each half cycle there will be a change (i.e., reversal of direction) in the axial component of the helical flux within the rod 12 which change in axial component will result in a change in axial flux linkages in the coil 26 ($d\phi/dt$) to result in the appearance of a signal $V_0$ at the output terminals 28 and 30 of the coil 26. $V_0$ will be some form of alternating current and its existence is such as to be able to actuate suitable mechanisms (not shown) for opening contacts or the like to thereby break the circuit 24.

The device 10, as already noted, may also be employed to detect a drop of current $I_1$ below a predetermined level and then initate corrective action to restore the current to that predetermined level. Thus, for example, if the circuit 24 is a welding circuit and the $I_1$ is the welding current flowing through the circuit 24 and through the rod 12, the rod 12 may be of such material proportioned and twisted to yield anisotropy so that when the current $I_1$ is the normal welding current, it will be sufficient to cause irreversible magnetic changes during each half cycle of current. The existence of the irreversible magnetic changes results in a change in direction of the helical flux within the rod 12 and hence a change in the direction of the axial flux component, whereby to cause a change in flux linkages in the coil 26 to thereby induce a voltage $V_o$ across the output terminals 28 and 30 of the coil 26. So long as there is the voltage $V_o$ appearing at the terminals 28 and 30, the mechanism is operating normally. However, if for some reason there is a loss of welding current in the circuit 24, $V_o$ will disappear and its disappearance may be monitored by suitable apparatus (not shown) that is readily designed by the skilled art worker to actuate a mechanism to restore welding. Thus, for example, when $V_o$ disappears, a suitable motor means may be actuated by mechanism not shown in FIG. 1 to move the welding rod closer to the workpiece to restrike the arc and resume normal operation.

Rod 12 may be of any suitable construction, either hollow or solid. It is presently preferred that rod 12 be a composite piece including a central conductive core 34 and an outer coating 36 of material having a high coefficient of magnetostriction. Thus, for example, the core 34 could be made of copper, whereas the outer coating 36 may be made of a nickel-iron alloy. This is particularly desirable in an application where substantial amount of current is to flow through rod 12 as most magnetostrictive materials are not very good conductors. Thus, if the rod 12 were made just of the material exhibiting a high coefficient of magnetostriction, the device 10 may exhibit unnecessarily high $I^2R$ losses to the disadvantage of the device. However, when the core 12 is made of a good current conductor, most or all of the current will flow through the core and yet the benefits of high magnetostriction can be secured by virtue of the coating 36.

As previously noted, the rod 12 exhibits its magnetic uniaxial anisotropy by virtue of it being twisted and being held in a twisted condition by the U-shaped member 18. In this connection, it should be noted that the anisotropy exhibited by the rod 12 is in a direction other than longitudinal or circular. The existence of uniaxial anisotropy in either the circular or longitudinal direction will not cause the device to operate as previously described. The above operation will only occur when the direction of anisotropy is other than the two directions specified, namely circular or longitudinal.

The anisotropy of rod 12 and the other rods to be described hereinafter can be obtained by other than twisting within the elastic limit and holding of the twist as by a U-shpaed member 18. Thus, for example, the device can be twisted beyond the elastic limit and then released and uniaxial anisotropy in the desired direction will result. An improvement in the anisotropy yielded by such permanently twisted rods may be improved by cycling the rods back and forth through a number of twists. The reason for this improvement is not fully understood but it has been observed. Still more improvement in the desired anisotropy has been obtained when the material being processed is both twisted and forced through a die at the same time. It is believed that similar results can be achieved by sequential operation, that is a twisting and then a stretching or a stretching and then a twisting as well as a simultaneous twisting and stretching. Other means of achieving magnetic anisotropy are by magnetic annealing which is a process in which the material being treated is heated to a temperature below its curie temperature and then is gradually cooled while being held in a magnetic field. For the rods to be used herein, the direction of the field is preferably helical. Clearly, the magnetic field used during magnetic annealing cannot be either longitudinal or circular as neither such field will yield a satisfactory rod for use in the present invention. Other means of achieving magnetic anisotropy are by either physically removing a portion of the rod or by adding material to the rod. Thus, for example, a helical groove can be machined into the outer surface of the rod and this will result in the rod becoming magnetically anisotropic in the helical direction. Alternatively, an added wire may be wound about the rod in a helical direction and welded thereto to add additional material, and this too will cause a helical magnetic anisotropy.

Irrespective of how the anisotropy is achieved, the device 10 of FIG. 1 will operate as described.

Figure 3:
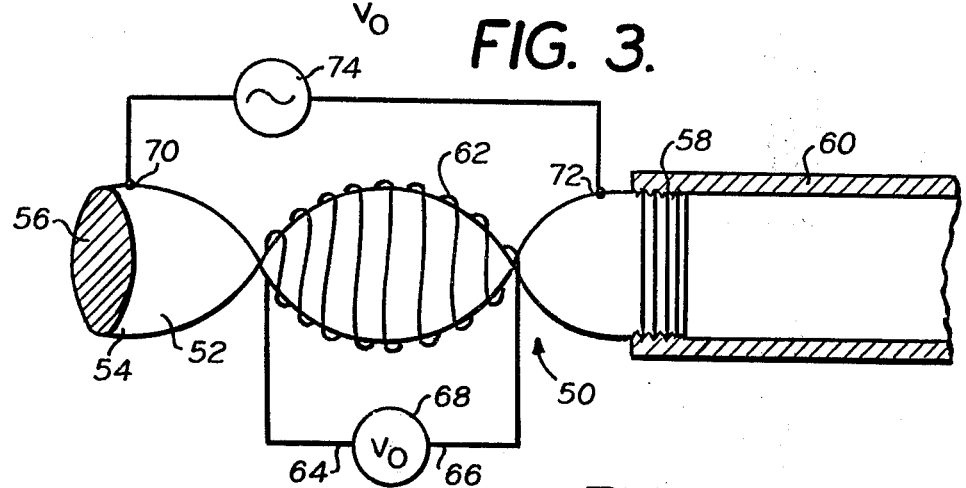
FIG. 3 is a view that is partly diagrammatic, partly sectional and partly in elevation illustrating a pressure measuring device embodying the present invention.
Figure 4:
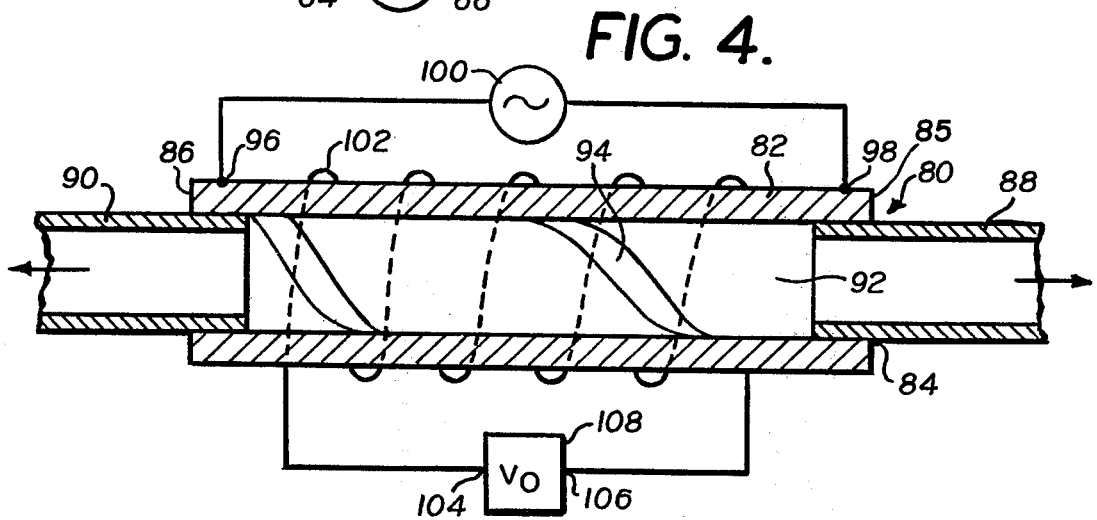
FIG. 4 is a view, partly diagrammatic and partly in section, illustrating a fluid flow measuring apparatus embodying the present invention.
Figure 5:
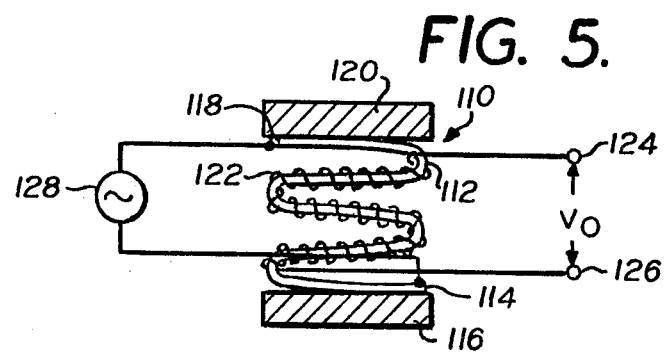
FIG. 5 is a view partly in section and partly in elevation illustrating a pushbutton embodying the present invention.

Likewise, in FIGS. 3, 4 and 5, the rods are all anisotropic which anisotropy may be achieved in any of the ways previously described. However, unlike the device 10 of FIG. 1, the devices 3, 4 and 5 rely on the superimposing of a second anisotropy resulting from torsional strain on the preexisting anisotropy of the device in order to operate. It is interesting to note that the preexisting anisotropy of the devices in FIGS. 3, 4 and 5 may be in any direction including longitudinal or circular. However, there will be no output experienced from these devices until an anisotropy in a direction other than longitudinal or circular is superimposed on the rod whereby to yield a resultant anisotropy that is neither longitudinal nor circular. It will be understood as the description of FIGS. 3, 4 and 5 indicates that in all these cases the superimposed anisotropy is a result of torsional strain and hence the resultant anisotropy will be helical.

Referring now to FIG. 3, a pressure gauge 50 is shown which pressure gauge is made of a hollow tube 52. Tube 52 is magnetostrictive and conductive and has a cross section that is other than rotatably symmetrical. By "rotable symmetry" is meant that the figure defined by the cross section cannot be rotated other than 180° and be caused to lie upon itself with complete congruence. Thus, for example, ellipses, irregular polygons, irregular star-shaped sections and the like are all other than rotatably symmetrical and may be employed as the cross-sectional shape of tube 52. As shown, the cross section of tube 52 is elliptical.

In accordance with the present invention, one end 54 of the tube 52 is closed by any suitable means such as a plug 56. The plug may be held in the end 54 by adhesives or by welding, soldering or mechanical securing elements such as rivets and screws. The other end 58 of the tube is open and is connected to a pressure line 60 which may have therein any suitable fluid, liquid or gas. The tube 52 is twisted beyond its yield point into the helical configuration shown in FIG. 3. Such twisting will normally produce an anisotropy in the tube 52 although this is not necessary for the operation of the device of FIG. 3. Thus, after twisting, if desired, the anisotropy produced as a result of the twisting step may be eliminated as by annealing or the like. However, if desired, it may be left in.

Preferably adjacent the opposite ends 54 and 58 of the tube 52 are a pair of terminals 70 and 72 for connection of the tube 52 to a suitable AC source 74. Assuming that initially the tube 52 is isotropic, when the AC signal from source 74 is applied to the tube 52 only a circular magnetic field will appear which will result in no longitudinal flux component within the rod 52 and hence the inducing of no voltage across the terminals 64 and 66 of the coil 62. Therefore, the voltmeter 68 will record zero. However, as pressure appears in the pressure line 60, this pressure will cause an untwisting of the helical tube 52 which untwisting will be a function of the pressure. As the pressure appears and builds, the untwisting will increase and the untwisting will increase to cause an ever increasing anisotropy to appear in the tube 52. Thus, as the anisotropy increases, more of the magnetization in tube 52 becomes helical, thereby resulting in a greater and greater longitudinal flux component in the tube 52. The size of the current 74 is sufficient to cause irreversible magnetic changes in the tube 52 during each half cycle of the current flow. These changes will result in changes of flux linkage with the conductive coil 62, which changes will grow as the amount of longitudinal component of flux grows. Thus it will be seen that the output voltage appearing at the voltmeter 68 will be a function of the pressure in the tube 60. Thus, if the voltmeter 68 is calibrated in pressure units, such as pounds per square inch, a direct readout of pressure can be achieved by this device.

Still another embodiment of the present invention is shown in FIG. 4 wherein a flow meter 80 is illustrated. The flow meter 80 comprises a tube 82 that is made of magnetically anisotropic magnetostrictive conductive material. Tube 84 has an inlet end 85 and an outlet end 86 that are respectively connected in any suitable manner to an inlet pipe 88 and an outlet pipe 90.

Provided on the interior wall 92 of the tube 82 is a helical ridge or vane 94 which may be placed on the interior wall as by machining or by securing a helically wound element thereto by welding, soldering or the like. The purpose of the ridge 94 will be understood as this description proceeds. Affixed to the opposite ends 84 and 86 of tube 82 are terminals 96 and 98, respectively, which terminals are connection to leads from a suitable source of AC current 100. Wound about a portion at least of the length of tube 82 is a conductive coil 102 which may be made of a suitable conductive material such as copper. The coil 102 may be wound on a bobbin and the bobbin with the coil thereon may be slid onto the outside of the tube 82 as like a sleeve. The alternative coil 102 may be wound directly on the tube, provided that the copper in the coil 102 is suitably insulated.

With no fluid flow through the tube 82, the current flowing through the tube from the source 100 will cause only a circular field to appear which circular field will not crosslink with the windings of coil 102 and hence will cause no output voltage $V_o$ to appear across the terminals 104 and 106 of the coil 102. However, as fluid commences to flow through the tube 82, it will engage the helical ridge 94 and the reactive forces resulting from the fluid impinging against said helical ridge will cause a slight twisting of the tube 82. This twisting of the tube 82 will induce some uniaxial anisotropy in the tube which will cause some helical magnetic field to appear in the tube walls. The helical field will, of course, have some longitudinal flux component which can now link with the coil 102. If there is a change in such flux linkages, as there would be if the value of the electric current flowing through the wall is large enough to cause irreversible magnetic changes each half cycle, whereby to cause a change in the direction of said helical field, a voltage will appear across the terminals 102 and 106. As the fluid flow through the tube 82 increases there will be an increased amount of twist in the tube 82 whereby to increase the degree of anisotropy and hence the amount of helical flux component will have a concomitantly increased longitudinal component. Thus, the voltage $V_o$ appearing across the terminals 104 and 106 will be a function of fluid flow. Hence a voltmeter 108 connected between the terminals 104 and 106 may be calibrated in suitable units of fluid flow, either volumetric or linear, and the device 80 will give a direct fluid flow readout by virtue of the properly calibrated voltmeter 108.

Referring now to FIG. 5, a push button 110 is shown which push button is composed of a longitudinally extending rod 112 that has been wound into a helical configuration. The rod 112 is also magnetostrictive and magnetically anisotropic. While the manner of achieving the magnetic anisotropy can be any desired method heretofore described, a simple way of achieving magnetic anisotropy in the coiled rod 112 is by first winding it into a helix and then either pulling the helix to stretch it beyond its elastic limit or by compressing the helix to compress it beyond its elastic limit. Both stretching and compression of a helically coiled rod twist the increments of the rod and thereby impart uniaxial anisotropy as previously described. The bottom of the rod 112, designated by the reference numeral 114, is secured to a suitable base 116 which is preferably fixed and the upper end 118 of the rod 112 is secured to the bottom of the face 120 of the push button 110, which face 120 is movable toward and away from the base 116 whereby to compress the coil 112 and thereby twist increments thereof. Wound about the turns of the coiled rod 112 is a conductive coil 122 having output terminals 124 and 126 across which an output voltage $V_o$ will appear in a manner to be described hereinafter. Coil 122 may be wound directly on the helical rod 112. However, it is preferred to wind it on a flexible bobbin which may be slid onto the coiled rod as a unit.

Connected to the ends 114 and 118 of the rod 112 is a suitable source 128 of AC current. The value of the current flowing from source 128 is such as to not cause irreversible magnetic changes at each half cycle when the push button is in its undepressed condition. Thus, normally, there will be no output voltage $V_o$ appearing across the terminals 124 and 126 of the coil 122. However, when the button is depressed, additional magnetic anisotropy will be imposed on the rod 112 which will be sufficiently great so that the current flowing from the source 128 can now cause irreversible magnetic changes during each half cycle which irreversible magnetic changes result in the change of direction of a helical flux component in the coiled rod 112 each half cycle. Thus, there is a longitudinal flux component in the rod 112 that is reversing each half cycle whereby to yield a large output voltage $V_o$ across the terminals 124 and 126 so long as the button is depressed. When the button is released, its own resiliency will restore it to its undepressed condition, whereby to cause voltage $V_o$ to disappear. If desired a supplemental spring may be employed to bias the push button face 120 to its normal condition which supplemental spring is especially desirable if the material from which the rod 112 is made does not have a good elastic modulus.

While I have herein shown and described the preferred form of the present invention and I have suggested modifications thereof, other changes and modifications may be made therein within the scope of the appended claims without departing from the spirit and scope of this invention.

I claim:

1. A pressure gauge comprising a current conductive rod which exhibits magnetic anisotropy in other than a purely circular or longitudinal direction, a conductive coil wound about said rod, and means for applying an alternating current through said rod of sufficient magnitude to produce a helical magnetization of said rod in a given direction during one half cycle of said current and for reversing the direction of said helical magnetization during the next half cycle of said current, whereby to produce a change in the linkage of axial flux in said rod with said conductive coil to cause an AC output signal at the terminal thereof, wherein the rod is magnetostrictive and the anisotropy results from the rod being twisted, and said rod is a hollow tube that is rotationally asymmetrical and twisted about its longitudinal axis, and further comprising means for closing one end of said tube and means for connecting the other of said tube to a pressure line, whereby as pressure in said line increases, said tube will be untwisted to increase helical anisotropy and the magnitude of said AC output signal.

2. A flow meter comprising a current conductive rod which exhibits magnetic anisotropy in other than a purely circular or longitudinal direction, a conductive coil wound about said rod, and means for applying an alternating current through said rod of sufficient magnitude to produce a helical magnetization of said rod in a given direction during one half cycle of said current and for reversing the direction of said helical magnetization during the next half cycle of said current, whereby to produce a change in the linkage of axial flux in said rod with said conductive coil to cause an AC output signal at the terminal thereof wherein the rod is magnetostrictive and the anisotropy results from the rod being twisted and said rod is a hollow tube having a helical ridge secured to the inner surface thereof, and further comprising means for connecting one end of an inlet pipe and the other end to an outlet pipe, whereby as flow through said tube increases, reactive forces operating against said helical ridge will cause said tube to twist to increase helical anisotropy and the magnitude of said AC output signal.

* * * * *